United States Patent [19]

Kosuge et al.

[11] 4,400,779
[45] Aug. 23, 1983

[54] METHOD AND APPARATUS FOR INDICATING MILEAGE CORRESPONDING TO REMAINING FUEL FOR VEHICLES

[75] Inventors: Shuichi Kosuge, Nagoya; Hiroshi Ogura, Kariya; Hiroshi Arai; Hisatoshi Ohta, both of Toyota, all of Japan

[73] Assignees: Toyota Jidosha Kogyo Kabushiki Kaisha, Toyota; Nippondenso Co., Ltd., Kariya, both of Japan

[21] Appl. No.: 249,877

[22] Filed: Apr. 1, 1981

[30] Foreign Application Priority Data

Apr. 3, 1980 [JP] Japan ................... 55-44459

[51] Int. Cl.³ ........................... G01M 13/26
[52] U.S. Cl. ...................... 364/442; 73/114
[58] Field of Search ............. 364/112; 73/113, 114

[56] References Cited

U.S. PATENT DOCUMENTS

| | | | |
|---|---|---|---|
| 3,908,451 | 9/1975 | Walker et al. | 73/114 |
| 4,046,998 | 9/1977 | Kuno et al. | 364/442 |
| 4,050,295 | 9/1977 | Harvey | 73/114 |
| 4,179,740 | 12/1979 | Malin | 364/442 |
| 4,217,644 | 8/1980 | Kato et al. | 364/442 |

*Primary Examiner*—Jerry Smith
*Attorney, Agent, or Firm*—Cushman, Darby & Cushman

[57] ABSTRACT

A method and apparatus for indicating mileage corresponding to remaining fuel for vehicles includes a microprocessor connected to receive input signals respectively indicating a traveled distance and a consumed fuel quantity in a predetermined short period. During such time when quantity of fuel remaining in the tank is above a certain threshold level, the mileage corresponding to the remaining fuel is calculated by multiplying the remaining fuel quantity by a fuel consumption (Km/l) which substantially corresponds to the average fuel consumption during a period between two recent successive fillings of the fuel tank. After the remaining quantity of fuel has reduced below the threshold level, the value of the fuel consumption is updated by increasing the weight of the momentary fuel consumption which reflects the actual running condition. The microprocessor repeatedly calculates the mileage at predetermined intervals and the numerical value of the calculated mileage corresponding to the remaining fuel is displayed on a display unit digitally.

6 Claims, 4 Drawing Figures

METHOD AND APPARATUS FOR INDICATING MILEAGE CORRESPONDING TO REMAINING FUEL FOR VEHICLES

BACKGROUND OF THE INVENTION

1. Field of the Invention

The present invention relates to a method and apparatus for indicating a mileage corresponding to remaining fuel for vehicles, which is designed to indicate the mileage or range which can still be traveled by a vehicle in accordance with its remaining fuel quantity.

2. Description of the Prior Art

The term "fuel consumption" is used in the specification to mean a traveled distance per unit fuel. It is also referred to as the rate of fuel consumption.

Methods and apparatus of the above type heretofore known in the art include one in which each time a unit quantity of fuel is consumed the momentary fuel consumption (or the distance traveled) is multiplied by the then remaining fuel quantity to determine the mileage or range which can still be traveled, and another in which the average fuel consumption obtained in accordance with the amount of fuel consumed and the distance traveled in an interval between the time of filling the fuel tank and the next filling of the fuel tank, is multiplied by the current quantity of fuel remaining in the fuel tank so as to determine the mileage or the range which can still be traveled.

However, in the case of the former method, since the mileage corresponding to remaining fuel is indicated by utilizing the momentary fuel consumption which is subject to a considerable variation in accordance with the running conditions of the vehicle, the indicated mileage corresponding varies considerably. In particular, there is a disadvantage that if the remaining fuel quantity is large, the degree of such variation increases in proportion to the remaining fuel quantity. The latter method is also disadvantageous in that since the mileage is indicated by utilizing the average fuel consumption so that the indicated mileage decreases in proportion to a decrease in the remaining fuel quantity, due to the fact that no consideration is given to the running conditions of the vehicle, the indicated possible mileage at each time of the vehicle running is not high in reliability and particularly the proper mileage cannot be indicated if the remaining fuel quantity is small.

SUMMARY OF THE INVENTION

With a view to overcoming the foregoing deficiencies in the prior art, it is the object of the present invention to provide an improved method and apparatus for indicating mileage corresponding to remaining fuel for vehicles, in which whether the remaining fuel quantity is smaller than a predetermined value is determined so that if it is not, the mileage is computed and indicated in accordance with the previous average fuel consumption, e.g., determined on the basis of the previous travel between two successive fillings of the fuel tank, whereas if it is, a momentary fuel consumption data obtained at predetermined intervals is added to the average fuel consumption mentioned above to gradually update it and thereby to compute and indicate the mileage in accordance with the thus updated average fuel consumption, whereby ensuring indication of the proper mileage corresponding to the remaining fuel quantity.

DESCRIPTION OF THE PREFERRED EMBODIMENT

The present invention will now be described in greater detail with reference to the illustrated embodiment.

Figure 1:
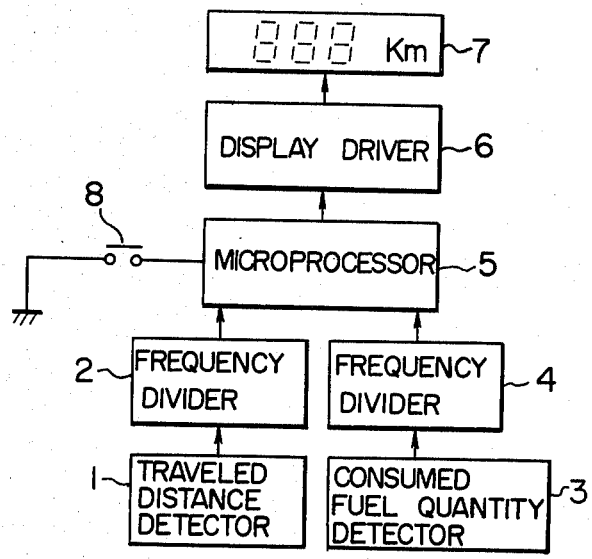
FIG. 1 is a block diagram showing the overall construction of an embodiment according to the present invention.

FIG. 1 is a block diagram showing an embodiment of an apparatus according to the present invention. In the Figure, numeral 1 designates a traveled distance detector for converting the distance traveled by a vehicle to pulses, in which a permanent magnet mounted on the vehicle speedometer cable is rotated so that a reed switch positioned near to the permanent magnet is turned on and off to generate 2,548 pulses per kilometer traveled. Numeral 2 designates a frequency divider for generating 10 pulses for each 2,548 pulses received. In other words, the frequency divider 2 generates a pulse for every 0.1 Km traveled. Numeral 3 designates a consumed fuel quantity detector for generating pulse signals corresponding to the quantity of fuel consumed. In the case of electronically controlled fuel injection systems, generally the duration of opening of the injection nozzle is proportional to the then current quantity of fuel injected. This fact is utilized by the consumed fuel quantity detector 3 so that the reference clock pulses are gated by the injection signal from the electronic fuel injection system to thereby convert the fuel injection quantity to a corresponding number of pulses. Numeral 4 designates a frequency divider for dividing the input frequency to generate a pulse for every 10 cc of fuel consumed. Numeral 5 designates a microprocessor whereby in accordance with the applied input signals the required computing operations are performed to internally compute the desired mileage corresponding to remaining fuel. It should be noted that the microcomputer 5 is directly supplied with power from the vehicle battery (not shown) and hence it is always in operation irrespective of turning on or off of a key switch. Numeral 6 designates a display driver for amplifying the signal from the microprocessor 5. Numeral 7 designates a three-digit display unit comprising 7-segment fluorescent display tubes. Numeral 8 designates a full-tank switch which is closed by the driver when the vehicle is refueled to fill up the tank, that is, the switch is turned on when the fuel tank is filled and it is turned off after a predetermined time required for processing data in the microprocessor 5.

Figure 2:
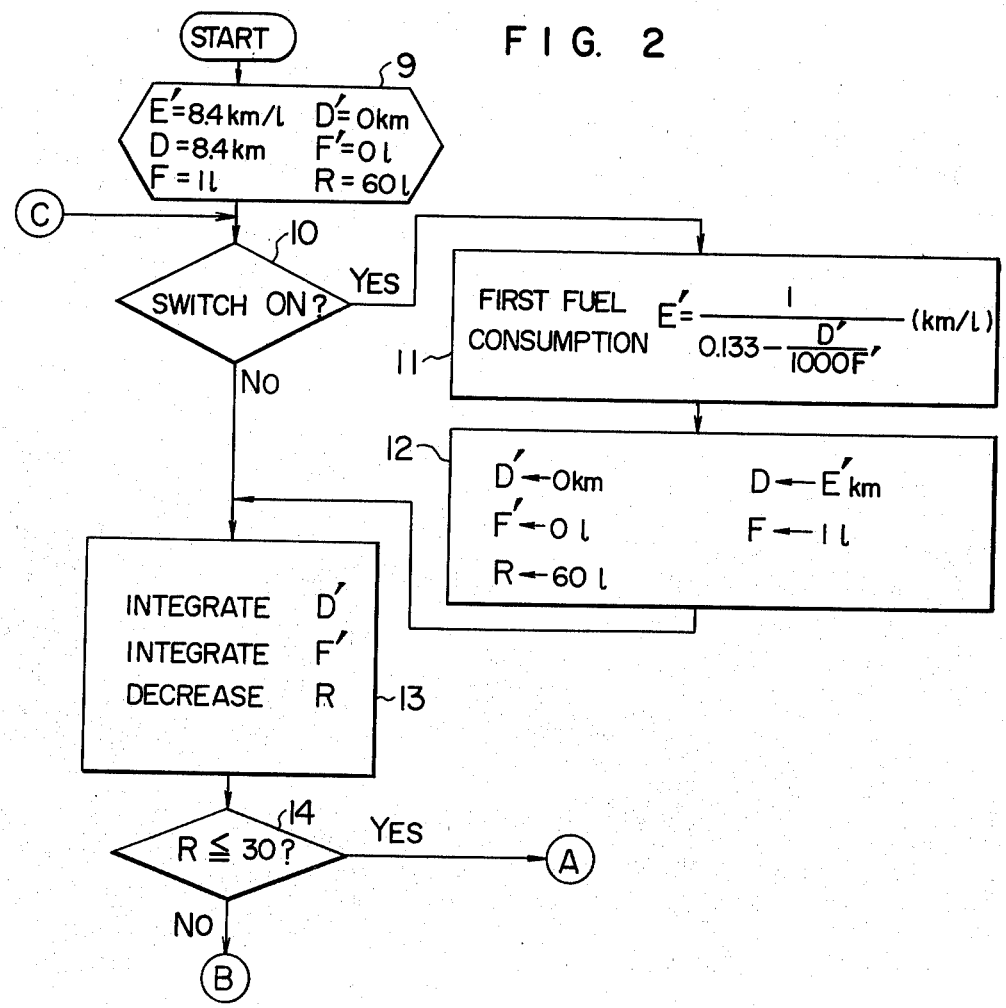
FIGS. 2 and 3 are flow charts showing the processing program of the microprocessor shown in FIG. 1.
Figure 3:
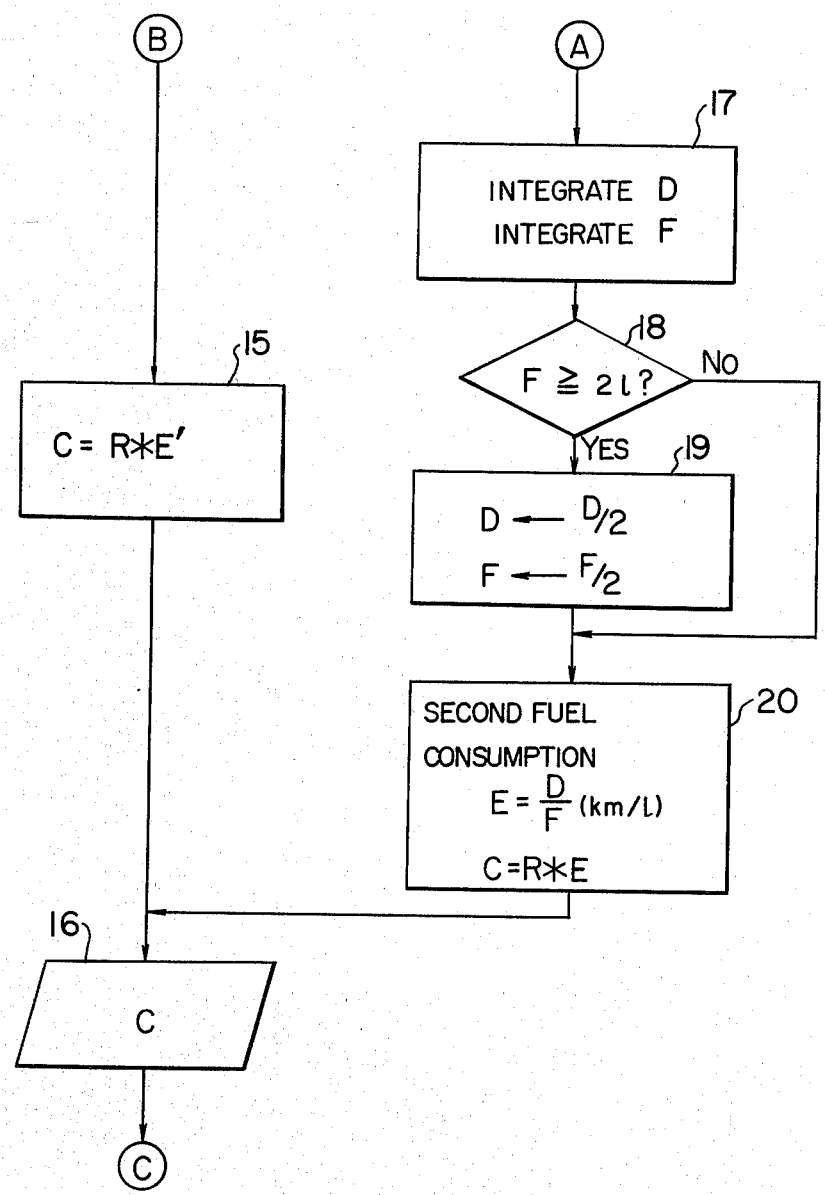

FIGS. 2 and 3 are flow charts showing the processing program which is executed inside the microprocessor 5. The operations of the individual units including the microprocessor 5 will now be described with reference to FIGS. 2 and 3. When the microprocessor 5 is connected to the vehicle battery and is supplied with a stabilized voltage from the vehicle battery through a stabilized supply circuit (not shown), the microprocessor 5 is brought into operation. At the start of the operation, both the distance traveled and the fuel consumption are zero and there is no data to be used as a first fuel consumption $E'$ which will be described later. As a result, an initialization step 9 sets the first fuel consumption E' to 8.4 Km/l, for example. Also, a distance D, a fuel quantity F, a traveled distance D', a consumed fuel quantity F' and a remaining fuel quantity R which will be described later are respectively set to 8.4 Km, 1 l, 0 Km, 0 l and 60 l, respectively. Then the control is transferred to a decision step 10 which in turn determines whether the fulltank switch 8 adapted to be closed when the tank is filled with fuel by the driver is in the closed position. It should be noted that in the present system whenever refuelling is to be made, it is required to fill the fuel tank fully. If the determination is "NO", the control is transferred to a step 13 which in turn integrates the traveled distance D' and the consumed fuel quantity F' and decreases the remaining fuel quantity R in response to the integration of the consumed fuel quantity F'. These integration and subtraction operations are performed by determining the generation of pulses from the frequency dividers 2 and 4. As a result, when the vehicle starts traveling, data of the traveled distance D' and the consumed fuel quantity F' are produced. On the other hand, if the determination of the step 10 is "YES" due to the filling of the fuel tank, then the control is transferred to a step 11 so that the first fuel consumption E' is computed in accordance with the traveled distance D' and consumed fuel quantity F'. The following equation, for example, may be used as a correction formula.

$$E' = \frac{1}{0.133 - \frac{D'}{1000F'}} \text{(Km/l)}$$

At this time, E'=8.4 Km/l which was preset by the initialization step 9 is extinguished. Then the control is transferred to a step 12 so that the traveled distance D' and consumed fuel quantity F' integrated thus far are reset to zero, the remaining fuel quantity R is set to its initial value, e.g., 60 l, the first fuel consumption E' (or precisely, the numerical value thereof) is set to a counter distance D which is different from the traveled distance D' and 1 l is set to a counter fuel quantity F which is different from the consumed fuel quantity F'. Then the control is transferred to a step 13 and thence the control is transferred to a decision step 14 which in turn determines whether the remaining fuel quantity R is less than 30 l. If the determination of the step 14 is "NO", the control is transferred to a step 15 of FIG. 3 so that a mileage C corresponding to the remaining fuel is computed by multiplying the remaining fuel quantity R by the first fuel consumption E'. (In the step 15, as the first fuel consumption E', the value set in the initialization step 9 is only used in such a situation in which the fuel tank has never been filled to the full.) Then the control is transferred to a step 16 which supplies the mileage C to the display driver 6.

On the other hand, if the step 14 determines that the remaining fuel quantity R is less than 30 l and its determination becomes "YES", the control is transferred to a step 17 of FIG. 3. The step 17 performs the integration of the distance D and the fuel quantity F in response to the generation of pulses from the frequency dividers 2 and 4. The distance D and the fuel quantity F are respectively set to the numerical value of the first fuel consumption E'(D=E') and 1 l (F=1 l) if the full-tank switch 8 has been closed and the control has been transferred to the step 12, whereas if no closing of the fulltank switch 8 has taken place by that time they represent respectively 8.4 Km (D=8.4 Km) and 1 l (F=1 l) which have been preset by the initialization step 9. Then the control is transferred to the next decision step 18 which determines whether the fuel quantity F is greater than 2 l. If the determination is "NO" or the fuel quantity F has not reached 2 l, the control is transferred to a step 20 so that a second fuel consumption E is computed from a calculation formula E=D/F(Km/l) and the mileage C is computed by multiplying the second fuel consumption E by the remaining fuel quantity R. Then the control is transferred to the step 16. On the other hand, if the fuel quantity F integrated by the step 17 is greater than 2 l, the determination of the step 18 becomes "YES" and the control is transferred to a step 19. The step 19 performs the necessary operations so that the then current distance D and fuel quantity F are each reduced to ½ thereof; D/2 and F/2. Then the control is transferred to the step 16 by way of the next step 20. In the step 13, with the exception that the fuel tank has never been filled to the full, the traveled distance D' and the consumed fuel F' are integrated to obtain the total travel distance and fuel consumption between the two successive fillings of the tank.

Thus, the control is returned from the step 16 to the decision step 10 of FIG. 2, and the above-mentioned step operations from the step 10 to the step 16 are repeated at the predetermined intervals.

The overall operation of mileage or distance indication under different conditions will now be described in regular sequence.

Firstly, when the stabilized voltage is applied to the component units 1 to 8 shown in FIG. 1 from the vehicle battery through the stabilized supply circuit, the microprocessor 5 is brought into operation and the control is transferred to the initialization step 9 of FIG. 2. The initialization step 9 presets the first fuel consumption E' to 8.4 Km/l, the distance D to 8.4 Km, the fuel quantity F to 1 l, the traveled distance D' to 0 Km, the consumed fuel quantity F' to 0 l and the remaining fuel capacity R to 60 l, and then the control is transferred to the decision step 10. If the fulltank switch 8 has not been closed, the determination of the step 10 becomes "NO" and the control is transferred to the step 13. The step 13 is such that if the pulses are generated from the frequency dividers 2 and 4, the necessary operations are performed to integrate the traveled distance D' and the consumed fuel quantity F' and to subtract from the remaining fuel quantity R the fuel quantity F' as it is integrated. If the vehicle has not been started, that is, the key switch has not been turned on, these operations of integration and subtraction are not performed and thus the control is transferred to the step 14. Since the remaining fuel quantity R has been preset to 60 l by the initialization step 9, the determination of the step 14 becomes "NO" and thus the control is transferred to the step 15 of FIG. 3 which in turn multiplies the remaining fuel quantity R by the first fuel consumption E' or performs a computation of 60 l×8.4 Km/l to obtain the resulting mileage C of 504 Km. Then the control is transferred to the step 16 so that a display signal indicative of the possible mileage C of 504 Km computed by the step 15 is applied to the display driver 6, and then the control is returned to the decision step 10 of FIG. 2. Thereafter, the above-mentioned operations from the decision step 10 to the step 16 are repeated at predetermined intervals so that so far as the vehicle is not started traveling, the display unit 17 gives a digital display of 504 Km in response to the display signal of 504 Km generated by the step 16. When the vehicle commences traveling so that the step 13 performs the integration of the traveled distance D' and the consumed fuel quantity F' and the subtraction operation on the remaining fuel quantity R, then the value of the possible mileage C computed by the step 15 varies or decreases correspondingly and the display on the display unit 7 gradually varies or decreases in response to the display signals generated by the step 16 and indicative of the possible mileages C.

Thereafter, as the vehicle travels further so that the value of the remaining fuel quantity R computed by the step 13 becomes smaller than 30 l, the determination of the next step 14 becomes "YES" and the control is transferred to the step 17 of FIG. 3. When the control is transferred to the step 17 for the first time, the distance D and the fuel quantity F have been respectively preset by the initialization step 9 to 8.4 Km and 1 l so that when the control is transferred to the step 18 following the step 17, its determination becomes "NO" and the control is transferred to the step 20. The step 20 sets the second fuel consumption E to D/F (Km/l) or 8.4/1 (Km/l)=8.4 Km/l and the mileage C is computed from this 8.4 Km/l and the then current remaining fuel quantity R. In this case, since the second fuel consumption E or 8.4 Km/l computed by the step 20 is equal to the first fuel consumption E' of 8.4 Km/l which was used in the preceding operations, the resulting mileage C remains practically unchanged. Then the control is returned to the decision step 10 of FIG. 2 through the step 16. Thereafter, the processing proceeding through the decision step 10, the step 13, the decision step 14, the step 17, the decision step 18, the step 20 and the step 16 and returning to the decision step 10 is repeated at the predetermined intervals. Thus, the value of the second fuel consumption E computed by the step 20 is varied in accordance with the distance D and the fuel quantity F which are integrated by the step 17 and consequently the mileage C computed by the step 20 is correspondingly varied or decreased. In this case, since the second fuel consumption E is computed in accordance with the distance D and the fuel quantity F which are integrated by the step 20, the second fuel consumption E approaches the actual momentary fuel consumption as the integrations of the distance D and the fuel quantity F progress.

Thereafter, when the vehicle travels further so that the fuel quantity F integrated by the step 17 reaches 2 l, the determination of the next step 18 becomes "YES" and the control is transferred to the step 19. The step 19 reduces each of the distance D and the fuel quantity F to ½, and then the control is transferred to the step 20. Since the second fuel consumption E represents the ratio of the distance D to the fuel quantity F, when the control is transferred to the step 20 by way of the step 19, the second fuel consumption E is computed in the same manner as the previous operations. However, on and after the next repeated operation the integrations of the distance D and the fuel quantity F are performed on the basis of their values reduced to ½ by the step 19 thus reducing the effect on the integrated distance D and fuel quantity F of the values of the distance D and the fuel quantity F before their reduction to ½. As a result, the second fuel consumption E computed by the step 20 further approaches the actual momentary fuel consumption.

Thus, since the above-mentioned operational processing is repeatedly performed so that each of the then current distance D and fuel quantity F is reduced to ½ each time the fuel quantity F integrated by the step 17 reaches 2 l (each time 1 l of fuel is consumed), the second fuel consumption E computed by the step 20 approaches the actual momentary fuel consumption still more. More specifically, after the remaining fuel quantity R has become smaller than 30 l, the second fuel consumption E is computed on the basis of the first fuel consumption E' to which is successively added in a weighted average manner the momentary fuel consumption data obtained upon each consumption of 1 l of fuel, and in this way the second fuel consumption E is gradually updated mainly in accordance with the momentary fuel consumption corresponding to the current running conditions. As a result, the displayed value of the mileage which is the product of the second fuel consumption E and the remaining fuel quantity R has a high degree of conformity with the current vehicle running conditions and is also high in reliability.

Thereafter, when the remaining fuel quantity of the vehicle decreases further so that the fuel tank is filled by the refueling and the full-tank switch 8 is closed, the transfer of the control to the decision step 10 of FIG. 2 causes its determination to become "YES" and then the control is transferred to the step 11. The step 11 computes the first fuel consumption E' from the formula $$E' = \frac{1}{0.133 - \frac{D'}{1000F'}},$$

and then the control is transferred to the step 12. As a result, the traveled distance D' is set to 0 Km, the consumed fuel quantity F' to 0 l, the remaining fuel quantity R to 60 l, the distance D to the first fuel consumption E' computed by the step 11 and the fuel quantity F to 1 l. Thus, when the control is transferred to the decision step 14 following the step 13, its determination becomes "NO" and the control is returned to the decision step 10 of FIG. 2 through the steps 15 and 16 of FIG. 3. Thereafter, the operational processing proceeding from the decision step 10 and returning to the same step through the step 13, the decision step 14, the step 15 and the step 16 is repeated at the predetermined intervals and the possible mileage C is gradually updated in accordance with the first fuel consumption E' computed by the step 11. As a result, the possible mileage displayed on the display unit 7 is also gradually changed to a decreased updated value in accordance with the value of the newly computed possible mileage.

Figure 4:
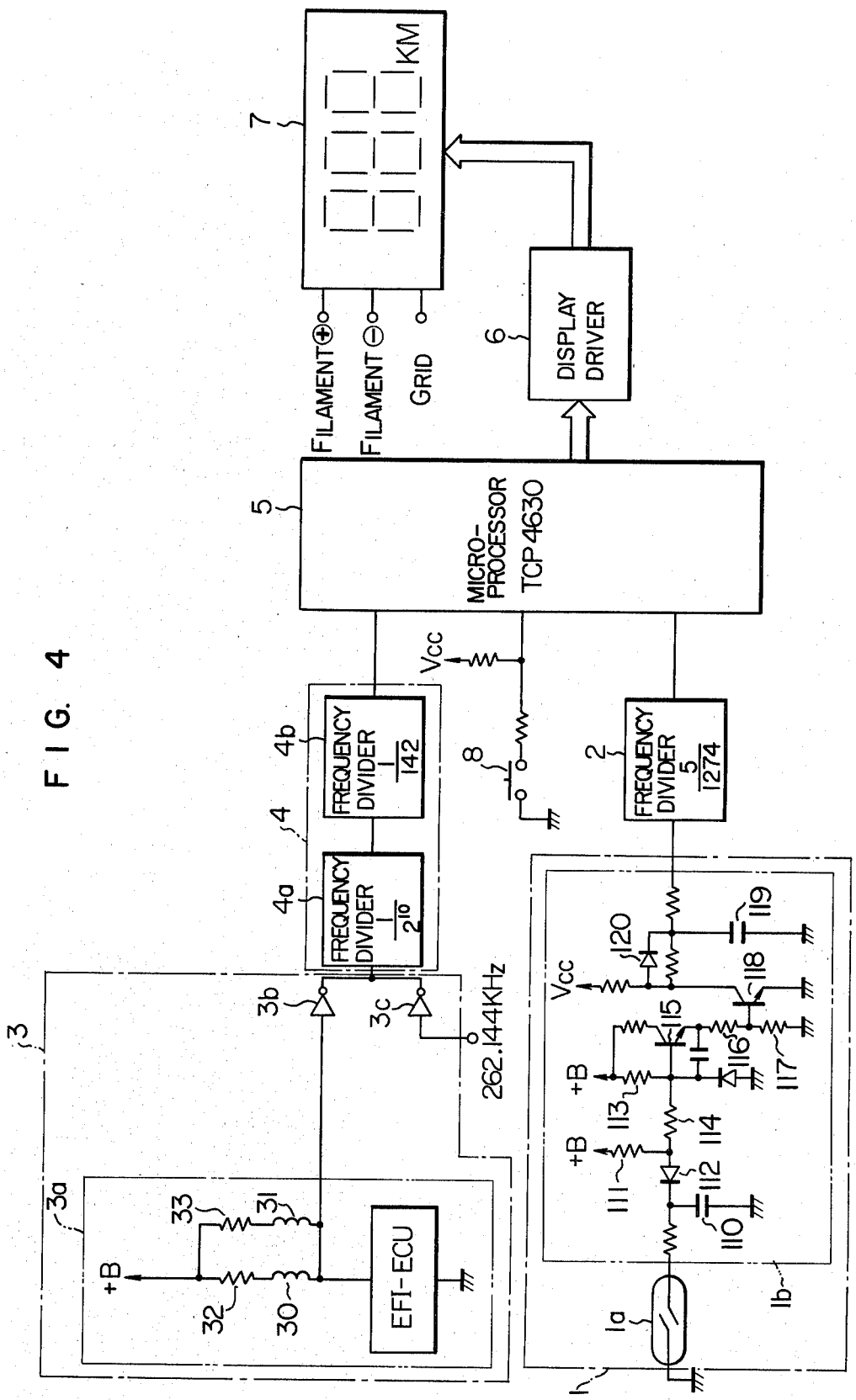
FIG. 4 is a detailed circuit diagram for the block diagram of FIG. 1.

Referring now to FIG. 4, there is illustrated by way of example a detailed circuit diagram of the block diagram shown in FIG. 1. In FIG. 4, numeral 1a designates a reed switch adapted to make on-off operations at the rate of four per crank-shaft revolution, an 1b an interface unit for detecting the signals from the reed switch 1a. The reed switch 1a and the interface unit 1b form the traveled distance detector 1 of FIG. 1 which generates 2,548 pulses for every 1 Km traveled. In short, when the reed switch 1a is turned on, a capacitor 110, which has been charged through a resistor 111 and a diode 112 from a +B power source, discharges through the reed switch 1a. Then, a current flows from the +B power source through resistors 113 and 114 and diode 112 to charge the capacitor 110. A transistor 115 is rendered conductive since the base thereof is biased, and a current flows through the transistor 115 and resistor 116 and 117 to further render a transistor 118 conductive. Depending on the conduction and non-conduction of the transistor 118, a capacitor 119 is charged from a power source Vcc through a diode 120 and is discharged through the transistor 118. As a result, as the reed switch 1a is turned on and off, a pulse signal is generated from the interface unit 1b. Numeral 2 designates the frequency divider of FIG. 1 which subjects the pulses generated from the interface unit 1b to 5/1274 frequency division (i.e., 10 pulses are generated for every 2,548 pulses received). Numeral 3a designates an electronic fuel injection controller unit (EFI-ECU) and its peripheral elements including injection solenoids 30, 31 and solenoid resistors 32, 33 and generates a signal corresponding to the fuel injection duration. This signal is subjected, along with 262.144 KHz clock signals, to wired OR operation by open-collector invert-buffers 3b and 3c. These components 3a, 3b and 3c form the fuel injection quantity detector 3 of FIG. 1 which generates pulses corresponding to the fuel injection duration. Numerals 4a and 4b designate frequency dividers forming the frequency divider 4 of FIG. 1 whereby the pulses corresponding to the fuel injection duration are subjected to $\frac{1}{2}^{10}$ and 1/142 frequency divisions to generate signal pulses each corresponding to a time required for injecting 10 cc of fuel. Numeral 5 designates a microprocessor of the TCP 4630 type which performs the computing operations as described in the foregoing. Numeral 6 designates the display driver, 7 the fluorescent display tube display unit, and 8 the full-tank switch. With this construction, the operation of the apparatus is the same as mentioned previously.

While, in the embodiment described above, the step 11 computes the first fuel consumption E' from the $$E' = \frac{1}{0.133 - \frac{D'}{1000F'}} \text{ (Km/l)},$$

any other correction formula may be used or alternatively a determination of the proper range of 6 Km/l≦E'≦15 Km/l may be added to the first fuel consumption E'. Further, while the decision step 18 and the step 19 are adapted to reduce each of the distance D and the fuel quantity to ½ when the fuel quantity F reaches 2 l, when the fuel quantity F may each be reduced to ⅓ with a view to increasing the weighting of the then current momentary fuel consumption or alternatively this may be effected in the range intermediary between 2 and 3 l. Further, while the computing method of fuel consumption is changed depending on whether the remaining fuel quantity R has reached a threshold value of 30 l, this threshold value may be changed to 20 l or 15 l. Still further, while the remaining fuel quantity R is computed by subtracting the consumed fuel quantity F', it may be determined by means of the liquid level sensor in the fuel tank. Still further, any known momentary fuel consumption meter may be used for the computation of momentary fuel consumption.

It will thus be seen from the foregoing description that in accordance with the present invention, by virtue of the fact that the mileage corresponding to remaining fuel of a vehicle is computed and displayed by determining whether the remaining fuel quantity is smaller than a predetermined value so that when the determination is negative the mileage is computed and displayed in accordance with the prior average fuel consumption (e.g., calculated in step 11 on the basis of D'/F'), whereas when the determination is affirmative the momentary fuel consumption data obtained at predetermined intervals is added to the prior average fuel consumption (e.g., by integrating D and F in step 17) to gradually update it and thereby to compute the mileage in accordance with the updated fuel consumption (e.g., the second fuel consumption E obtained in step 20), the mileage taking account of the running conditions can be displayed. Consequently, when the remaining fuel quantity is greater than the predetermined value variations in the mileage due to the running condition is prevented and when the remaining fuel is less than the predetermined quantity, the mileage corresponding to the running conditions can be displayed with a high reliability. Another great advantage is that since the momentary fuel consumption data obtained at predetermined intervals is added successively to the prior fuel consumption to obtain the updated fuel consumption when the remaining fuel quantity is smaller than the predetermined value, there is no embarassment due to any abrupt change in the displayed possible mileage during the transition from the average fuel consumption and the updated fuel consumption, thus preventing any feeling of strangeness on the part of the vehicle driver. Still another great advantage is that since the updated fuel consumption is updated in a weight average manner, the possible mileage variation associated with the fuel consumption variation can be made smooth.

We claim:

1. In a method of indicating a mileage corresponding to remaining fuel for a vehicle including the steps of detecting a distance traveled by a vehicle, detecting a quantity of fuel consumed by said vehicle, computing a fuel consumption in accordance with said detected traveled distance and consumed fuel quantity, computing a mileage of said vehicle in accordance with said computed fuel consumption and a quantity of fuel remaining in said vehicle and indicating said computed mileage, the improvement comprising the steps of:
   determining whether said remaining fuel quantity is smaller than a predetermined value;
   computing said mileage in accordance with a prior average fuel consumption when the result of said determination is negative;
   successively updating said average fuel consumption by modifying the same with momentary fuel consumption data obtained at predetermined intervals when the result of said determining step is affirmative, and
   computing said mileage in accordance with said updated fuel consumption when the result of said determination is affirmative.

2. A method according to claim 1, wherein said prior average fuel consumption used to compute said mileage, when the result of said determining step is negative, is determined on the basis of an average fuel consumption between two successive fillings of a fuel tank.

3. A method according to claim 1, wherein said step of successively updating said average fuel consumption, when the result of said determining step is affirmative, includes generating a first pulse signal each time a predetermined small distance is traveled by said vehicle and includes generating a second pulse signal each time a predetermined small quantity of fuel is consumed, said average fuel consumption being updated in response to said first and second pulse signals.

4. A method of indicating a mileage corresponding to remaining fuel for a vehicle comprising the steps of:

generating a first pulse signal each time a predetermined small distance is traveled by said vehicle;

generating a second pulse signal each time a predetermined small quantity of fuel is consumed;

integrating, in response to said first and second pulse signals, a total distance traveled and a total quantity of fuel consumed from the previous filling of a fuel tank of said vehicle;

calculating, in response to a signal indicating that the fuel tank has just been filled, a first fuel consumption by a microprocessor by solving a formula as a function of an average fuel consumption during a time period between said previous filling of the fuel tank and the filling at this time, said average fuel consumption being determined by dividing said integrated total distance traveled by said integrated total quantity of fuel consumed;

determining a remaining quantity of fuel in the fuel tank by subtracting from the capacity of the fuel tank a total quantity of fuel consumed obtained by integrating thus far;

determining whether the remaining quantity of fuel is less than a predetermined threshold quantity;

calculating said mileage by multiplying said remaining quantity of fuel by said first fuel consumption, when the remaining quantity of fuel is above said predetermined threshold quantity;

successively executing the following substeps (a) through (c) when the remaining quantity of fuel is less than said predetermined threshold quantity, (a) integrating a distance and integrating a quantity of fuel in order to calculate a second fuel consumption, said integration of the distance being carried out by sequentially adding said predetermined small distance in response to said first pulse signal to a base distance whose numerical value corresponding to said first fuel consumption, said integration of the quantity of fuel being carried out by sequentially adding said predetermined small quantity of fuel in response to said second pulse signal to a unit quantity of fuel, when said remaining quantity of fuel is less than said predetermined threshold quantity;

(b) calculating a second fuel consumption by dividing the integrated distance of substep (a) by the integrated quantity of fuel of substep (a);

(c) calculating said mileage by multiplying said remaining quantity of fuel by said second fuel consumption;

converting in a display driver coupled to said microprocessor a value indicative of said calculated mileage into a display signal in both cases when the remaining quantity is above said predetermined threshold quantity and less than said predetermined threshold quantity;

displaying on a digital display unit in response to said display signal; and thereafter continuously repeating the above sequence of steps at given uniform intervals to effect changes in said displayed possible mileage.

5. A method according to claim 4, wherein when the remaining quantity of fuel is less than said predetermined threshold quantity, there occurs after said step (a), the further substeps of;

(d) determining whether the integrated quantity of fuel is less than a predetermined quantity, and (e) halving the integrated distance and the integrated quantity of fuel, when the integrated quantity of fuel is more than the predetermined quantity, whereby in said substep (a) of the next processing cycle, integration of the distance and integration of the quantity of fuel are carried out respectively by adding said predetermined small distance to said halved integrated distance and by adding said small quantity of fuel of said halved integrated quantity of fuel.

6. An apparatus for indicating a mileage corresponding to remaining fuel for a vehicle comprising:

first signal generating means for generating a signal each time a predetermined small distance is traveled by said vehicle;

second signal generating means for generating a signal each time a predetermined small quantity of fuel is consumed;

a full-tank switch operable by a driver of said vehicle to be turned on each time a fuel tank is fully filled;

a microprocessor connected to said first signal generating means, second signal generating means, and said full-tank switch for repeatedly calculating said mileage corresponding to remaining quantity of fuel at predetermined intervals, said microprocessor being adapted to be connected directly to a power source to maintain the same always operable, said microprocessor including, means for integrating a total distance (D') and a total quantity of fuel consumed (F') in response to said first and said second signal generating means, said integrating means being reset each time the fuel tank is filled to the full, means for calculating a first fuel consumption (E') from an equation as a function of D'/F' and corrected by a factor depending on the type of the vehicle, the D'/F' corresponding to an average fuel consumption between the previous filling of the fuel tank and the filling at this time, means for determining a remaining quantity of fuel by subtracting from the capacity of the fuel tank the total quantity of fuel consumed obtained by said integrating means, means for determining whether the remaining quantity of fuel is less than a predetermined threshold quantity, means for calculating said mileage by multiplying said remaining quantity of fuel by said first fuel consumption (E') obtained by said means for calculating the same, when the remaining quantity of fuel is above said predetermined threshold quantity, means for integrating a distance (D) and a quantity of fuel (F) respectively, said distance (D) being integrated by sequentially adding said predetermined small distance in response to the signal from said first signal generating means to a base distance whose numerical value corresponding to said first fuel consumption (E'), said quantity of fuel (F) being integrated by sequentially adding said predetermined small quantity of fuel in response to the signal from said second signal generating means to a unit quantity of fuel (1 l), when said remaining quantity of fuel is less than said predetermined threshold quantity, means for calculating a second fuel consumption (E) by dividing the integrated distance (D) by the integrated quantity of fuel (F) received from said integrating means, and means for calculating said mileage by multiplying said remaining quantity of fuel by said second fuel consumption (E);

a display driver connected to said microprocessor for converting a value indicative of said calculated mileage into a display signal; and a display unit operative in response to the display signal from said display driver for displaying the value of said calculated mileage digitally.

* * * * *